United States Patent [19]

Zeff

[11] Patent Number: 5,743,215
[45] Date of Patent: Apr. 28, 1998

[54] CAT TOY FOR RELIABLY TRIGGERING PLAY OR ATTACK BEHAVIOR

[76] Inventor: Jack D. Zeff, 12061-46 Brighton River, Fountain Valley, Calif. 92708

[21] Appl. No.: 724,083

[22] Filed: Sep. 30, 1996

[51] Int. Cl.[6] ................................................. A01K 29/00
[52] U.S. Cl. ................................................. 119/708; 119/707
[58] Field of Search ................................. 119/707, 708, 119/711; 43/44.96, 44.97, 44.94, 43.12, 17.2, 42.2, 42.24

[56] References Cited

U.S. PATENT DOCUMENTS

| | | | |
|---|---|---|---|
| 2,307,905 | 1/1943 | Ament | 119/708 |
| 2,718,873 | 9/1955 | Buckner | 119/711 |
| 3,295,499 | 1/1967 | Manchester | 119/708 |
| 3,664,054 | 5/1972 | Pickering | 43/44.96 |
| 4,499,855 | 2/1985 | Galkiewicz | 119/708 |
| 4,517,922 | 5/1985 | Lind | 119/708 |
| 4,712,510 | 12/1987 | Tae-Ho | 118/708 |
| 4,930,448 | 6/1990 | Robinson | 119/708 |
| 4,940,018 | 7/1990 | Edling | 119/708 |
| 5,121,567 | 6/1992 | Boone | 43/42.24 |
| 5,467,740 | 11/1995 | Redwine | 119/707 |
| 5,474,032 | 12/1995 | Krietzman | 119/708 |
| 5,505,161 | 4/1996 | Swendseid | 119/708 |
| 5,611,297 | 3/1997 | Veloce | 119/708 |

*Primary Examiner*—Edgar S. Burr
*Assistant Examiner*—Daniel J. Colilla
*Attorney, Agent, or Firm*—Graham & James

[57] ABSTRACT

An animal toy comprising a durable, flexible target attached to the end of a line of a pole and reel assembly. The target is made of a plastic material in order to withstand chewing and breaking by the animal. Further, the target may be shaped as a circular ring or drooping spiral to allow for easier attack and chewing by the animal. The target is resilient so that it moves in and of itself apart from the pole to more reliably evoke the play or attack behavior of the animal or cat.

18 Claims, 1 Drawing Sheet

5,743,215

1

CAT TOY FOR RELIABLY TRIGGERING PLAY OR ATTACK BEHAVIOR

BACKGROUND OF THE INVENTION

1. Field of the Invention

This invention relates generally to a toy for pet animals utilizing a dangling target which serves as the object of play for the animal.

2. Description of the Prior Art

Toys and exercise devices for domestic animals employing dangling objects are well known in the art. The pendant pet toy in Swendseid, "Pendant Pet Toy," U.S. Pat. No. 5,505,161 shows an elastic cord suspended above a floor with a toy, such as a stuffed mouse, attached to the end of the cord, suspending the toy in midair. The suspended feline toy and exerciser in U.S. Pat. No. 5,474,032 to Krietzman et al. shows a device with a dangling object that can be attached to a door so that a cat can play by itself without the assistance of its human master. The animal toy in U.S. Pat. No. 4,930,448 to Robinson shows a base housing with an elongated member with an object shaped as a ball, mouse, butterfly or other creature secured to the free end of the elongated member. Similar animal toys using a base and a play object dangling from above by a member attached to the base are shown in U.S. Pat. No. 4,940,018 to Edling, U.S. Pat. No. 4,517,922 to Lind, and U.S. Pat. No. 3,295,499 to Manchester.

Other inventions relating to animal toys have employed a fishing rod-like configuration. U.S. Pat. No. 5,467,740 to Redwine shows a pole and reel assembly with a target preferably in the form of a fluffy ball. U.S. Pat. No. 4,499,855 to Galkiewicz shows a rod with a cord where a soft ball, brightly colored ribbon or a soft sculptured mouse is attached. Other animal toys using rods have been described in U.S. Pat. No. 4,712,510 to Tae-Ho and U.S. Pat. No. 2,307,905 to Ament.

In all of the inventions described above, the dangling object that serves as a target for animal play has been a ball, mouse, ribbon or other essentially nondurable object and which was largely a rigid target. In other words, the thing used as the target which would be attacked by the cat would not move to any extent. Only the strings, whips and other devices attached to the target would move and impact motion to the target. The target itself was substantially rigid or immobile. In particular, the objects used in these inventions have not been lived for chewing by the animal. Consequently, what is needed in the art is a dangling toy for pet animals that can be chewed and played with by the animal without breakage or deterioration, and further which will give the type of movement which will most easily trigger the instinctive attack response from a cat.

SUMMARY OF THE INVENTION

The present invention discloses a toy for domestic animals employing a target play object attached to a pole and a reel. Specifically, the target is made of a durable material that cannot easily be broken or chewed up by the animal. The invention is also described as a toy for use with a pet comprising a flexible whip and a line coupled at one end to the flexible whip. A target is attached to an opposing end of the line. The target is comprised of a durable and flexible material resistant to chewing and breakage by animal play. In the preferred embodiment the target is made of a resilient plastic, and is either spirally shaped or circularly shaped. If circular, the circle is discontinuous to increase the flexibility of the target.

2

The toy may be combined with a weight and the target may include a holder for temporarily attaching the weight. In one embodiment the holder is a closed circle and the weight is in the shape of a frustum of a cone.

The toy may further comprise at least one weight coupled to the line between the whip and the target to create a compound pendulum therebetween. A multiple of such weights may be coupled to the line between the whip and the target to create a multiply compound pendulum therebetween.

The target is spring-like so that it assumes different overall configurations based on its own motion and is capable of motion in and of itself without movement of the line or whip in order to more reliably evoke attack from the pet. The invention is also defined as a cat toy comprising a flexible pole having a handle attached to a base segment of the pole. A plurality of rings is attached to the pole between the handle and a tip of the pole. A reel with a spool is mounted on the pole. A line is attached to the spool of the reel. The line is extended through the rings of the pole, so that the length of the line extending from the reel is adjustable. A target is attached to the end of the line. The target is comprised of a durable and flexible; material.

The invention is also a method for evoking a play or attack behavior in pet cats comprising the steps of attaching a line to a flexible pole and irregularly moving a target from the free end of the line by moving the pole and line. The target is composed of a flexible and durable material. An irregular repeated motion is simultaneously imparted to the target itself. The target is resilient and capable of motion to change its configuration.

The method further comprises executing compound pendulum motion of the target.

The invention may be better visualized by now turning to the following drawings, where like elements are referenced by like numerals.

The invention and its preferred embodiments are now illustratively understood in the following detailed description.

DETAILED DESCRIPTION OF THE PREFERRED EMBODIMENTS

An animal toy comprising a durable, flexible target attached to the end of a line of a pole and reel assembly. The target is made of a plastic material in order to withstand chewing and breaking by the animal. Further, the target may be shaped as a split circular ring or drooping spiral to allow for easier attack and chewing by the animal. The target is resilient so that it moves in and of itself apart from the pole to more reliably evoke the play or attack behavior of the animal or cat.

Figure 1:
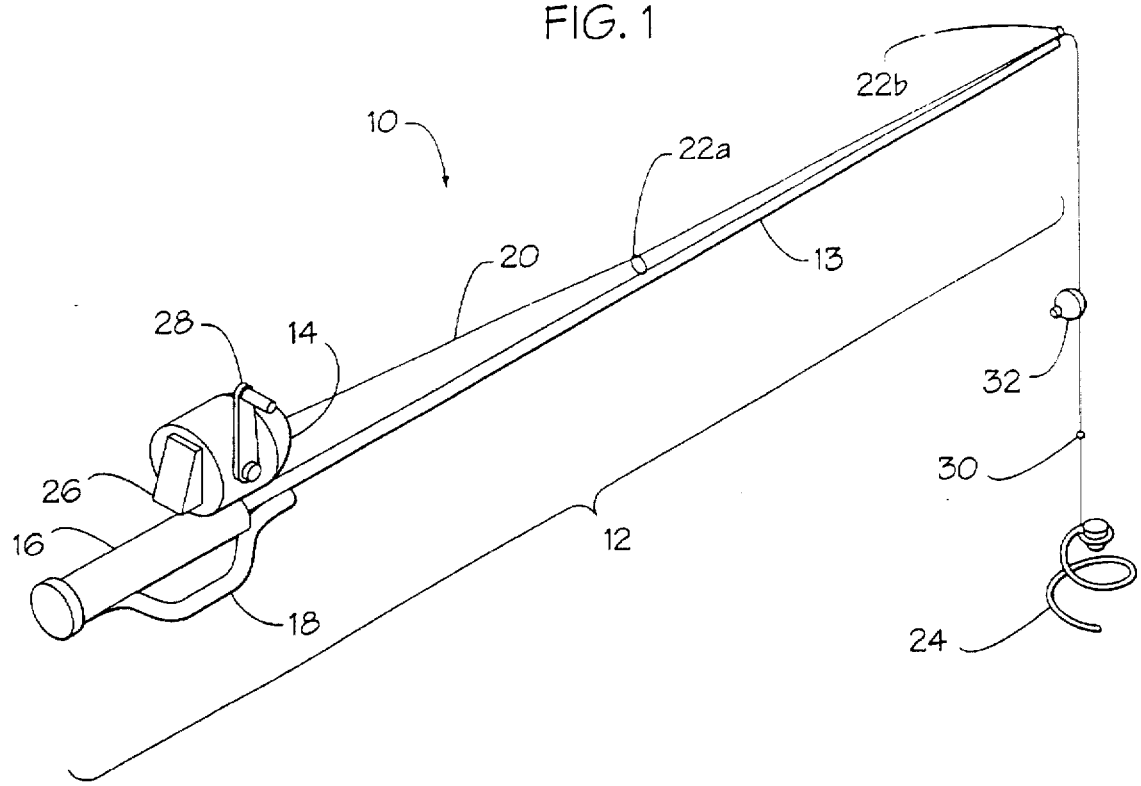
FIG. 1 is a side elevational view of a preferred embodiment of the animal toy of the present invention.

FIG. 1 is a side elevational view of the animal toy, generally denoted by reference numeral 10. In the illustrated embodiment, animal toy 10 is comprised of a pole 12 is with a reel 14 having a crank 28. Pole 12 has a handle 16 at the base of the pole and an opening 18 in which a finger may be placed to further grip the pole. Handle 16 is coupled to a flexible whip or rod 13. Reel 14 contains several yards of fine line 20, which is wound on a spool within the reel (not shown). The line 20 is guided through rings 22a and 22b connected to rod 13. Beyond ring 22b, line 20 is attached to a target 24. A shot weight 30 may be attached to line 20 between target 24 and the end of line 20 coupled to the end ring 22b of rod 13. In addition, other objects, such as a colored plastic bob 32 may be attached to line 20 between target 24 and the end of line 20 coupled to the end ring 22b of rod 13. In the illustration of FIG. 1, bob 32 is attached to line 20 between the distal end of rod 13 and weight 30, while weight 30 is attached to line 20 between bob 32 and target 24. Any other arrangement or additional elements could be added to line 20 between the distal end of rod 13 and target 24 as may be desired. The effect of each of these intermediate objects is to create a compound pendulum, which will enhance the motion and play action of target 24 as described below in addition to provided more attractive visual motion.

Pole 12 may be configured as a conventional child's fishing rod and reel or may assume many other forms consistent with the teachings of the invention. For example, reel 14 may be omitted, as may handle 16 or grip 18 with only rod 13 and an end attached line 20 provided instead. The form of the resilient whip or rod and its string attachment may assume any form previously used in the art or later devised without departing from the spirit and scope of the invention.

In the illustrated embodiment to operate the invention, the line 20 can be released during casting by pressing a button 26. The line can be pulled back by turning the crank 28 away from the person operating the toy in a clockwise manner. Movement of handle 16 results in an exaggerated movement of the distal end of rod 13 and hence a quick whip-like action to target 24 attached thereto by line 20. However, in addition to this type of action an additional element of movement is added to toy 10 by reason of the resiliency and movement of target 24 itself as described below.

Figure 2:
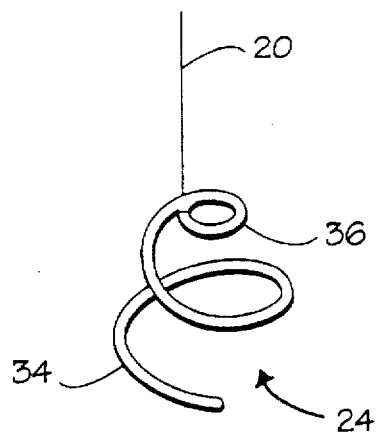
FIG. 2 is a perspective view of the target used in the present invention as shown in FIG. 1.

FIG. 2 shows an enlarged perspective view of target 24. Target 24 is attached to the line 20 by tying the line around the target or other conventional means. Target 24 is made from a durable, flexible plastic material that is resistant to breakage and chewing by the animal, such as tear-proof polyethylene sheet of the type used in many conventional packaging lids.

Target 24 is generally shaped in the form of a resilient circular spiral with a discontinuity in order to increase the flexibility and movement of target 24 and to allow for easier chewing by the animal. The thickness of target 24 is such that the weight of its arms 34 is sufficient to cause them to droop and to stretch out the spiral, but not so great to overcome the inherent resiliency of the material to prevent oscillation of arms 34 as target 24 is moved by rod 13 and line 20. Thus target 24 by virtue of its own weight and resiliency tends to itself spring or oscillate so as to present a target of varying size and movement even after rod 13 and line 20 has ceased moving.

Figure 3:
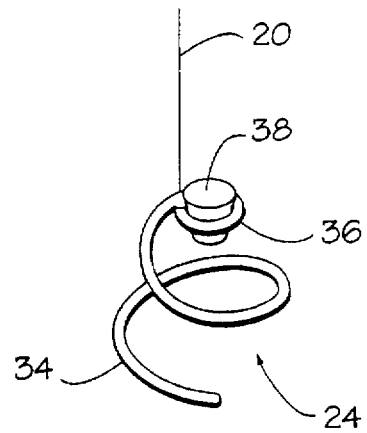
FIG. 3 is an enlarged perspective view of the target of FIG. 2 combined with a weight.

Although it is not well understood, the play or attack behavior of cats, even older cats, is more effectively triggered by an irregular, erratic or random motion, which is nonperiodically repeated. Most cats will not attack an object if it is still or after it has ceased to move, even if the target has other attractive features such as sound, odor, shape or texture. A cat will further be less likely interested enough to attack a target if it ceases movement after a short time. If the target movement is intermittent or if its motions are continuous but changing, then the cat is much more likely to pounce. The regular motion of a clock wheel or clock movement, because of its predictable repetition is rarely sufficient to evoke an attack response. The key element in evoking the attack response is repeated and somewhat erratic movement, such as is executed by springy spiral target 24 driven by a flexible whip or rod 13 through a compound pendulum comprised of line 20 and one or more intermediate weights such a weight 30 or bob 32. The attack behavior of a cat is more reliably evoked by the arrangement of FIGS. 1–3 than if a passive target, such as a stuffed cloth mouse, were attached to the same string and rod combination. In addition, such a cloth mouse will become frayed and chewed within a few months usage and further loses appeal to the cat, which prefers a fresh appearing or substantially unmauled target. Target 24 acts as a spring element coupled to the toy system, receiving energy and motion from it and appearing to spring, move or reactive irregularly or in complicated ways which tend to unerringly interest and trigger an attack from the cat.

In the illustrated embodiment an enclosed circle 36 is located on the target to contain a weight 38 (shown in FIG. 3) to improve the swaying motion of the target and to improve casting of the target. The weight is preferably shaped as a frustum of a cone, like a cork-shape, in order to remain temporarily wedged or positioned within the enclosed circle 36, although any means of temporary attachment could be employed. By adding weight to target 24, its motion is affected and a variation in the play action can be realized.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A toy for use with a pet comprising:

a flexible rod;

a line attached to said rod and depending from a distal end of said rod; and a target attached to an end of said line distal to said rod, said target being comprised of a durable and flexible material resistant to chewing and breakage by animal play formed as a spiral suspended from a center thereof by said line with outer arms of said spiral hanging spring-like below said center so that said arms will continue to oscillate after the rod and the line have ceased movement.

2. The toy of claim 1 wherein said target is made of a resilient plastic.

3. The toy of claim 1 wherein said target is circularly shaped.

4. The toy of claim 1 in further combination with a weight and wherein said center of said target comprises a holder for temporarily attaching said weight.

5. The toy of claim 4 wherein said holder is a closed circle.

6. The toy of claim 4 wherein said weight is in the shape of a frustum of a cone.

7. The toy of claim 1 further comprising at least one weight coupled to said line between said whip and said target to create a compound pendulum therebetween.

8. The toy of claim 7 multiple ones of said weights are coupled to said line between said whip and said target to create a multiply compound pendulum therebetween.

9. A cat toy comprising:

a flexible pole having a handle attached to a base segment of the pole;

a plurality of rings attached to said pole between the handle and a tip of the pole;

a reel with a spool mounted on said pole;

a line attached to said spool of said reel, said line being extended through the rings of said pole, so that the length of said line extending from said reel is adjustable; and a target attached to the end of said line, said target being comprised of a durable and flexible material formed as a spiral suspended from a center thereof by said line with outer arms of said spiral hanging spring-like below said center so that said arms will continue to oscillate after the rod and the line have ceased movement.

10. The cat toy of claim 9 wherein said target is made of a plastic resilient material.

11. The cat toy of claim 9 in further combination with a weight and wherein said center of said target comprises a holder for holding said weight.

12. The cat toy of claim 11 wherein said weight is in the shape of a frustum of a cone.

13. The cat toy of claim 9 wherein said holder is a closed circle.

14. The toy of claim 9 further comprising at least one weight counted to said line between said whip and said target to create a compound pendulum therebetween.

15. The toy of claim 14 multiple ones of said weights are coupled to said line between said whip and said target to create a multiply compound pendulum therebetween.

16. A method for evoking a play or attack behavior in pet cats comprising the steps of:

attaching a line to a flexible pole;

providing a target comprised of a durable and flexible material formed as a spiral suspended from a center thereof by said line with outer arms of said spiral hanging spring-like below said center so that said arms will continue to oscillate after the rod and the line have ceased movement;

suspending said target from the end of said line;

irregularly moving said target by moving said pole and line; and simultaneously imparting an irregular repeated motion to said target itself so that said target will continue to move autonomously thereby stimulating a response by pet cats.

17. The method of claim 16 further comprising attaching a weight to said line between said pole and said target so that said target will exhibit compound pendulum motion.

18. A toy for use with a pet comprising:

a flexible rod;

a line attached to said rod and depending from a distal end of said rod;

a target attached to an end of said line distal to said rod, said target being comprised of a durable and flexible material resistant to chewing and breakage by animal play formed as a spiral suspended from a center thereof by said line with outer arms of said spiral hanging spring-like below said center so that said arms will continue to oscillate after the rod and the line have ceased movement; and a weight attached to a center of said target.

* * * * *